Aug. 30, 1927.

D. E. HARDING 1,641,082

MARKING MACHINE

Filed Oct. 27, 1926

Inventor:
Dana E. Harding
By James R. Hodder
Atty

Aug. 30, 1927.

D. E. HARDING 1,641,082

MARKING MACHINE

Filed Oct. 27, 1926

Inventor:
Dana E. Harding
By James R. Hodson
Atty

Aug. 30, 1927.

D. E. HARDING 1,641,082

MARKING MACHINE

Filed Oct. 27, 1926   5 Sheets-Sheet 5

Inventor:
Dana E. Harding
By James R. Hodder
atty

Patented Aug. 30, 1927.

1,641,082

UNITED STATES PATENT OFFICE.

DANA E. HARDING, OF MELROSE, MASSACHUSETTS, ASSIGNOR TO HARDING ENGINEERING COMPANY, OF EAST BOSTON, MASSACHUSETTS, A CORPORATION OF MASSACHUSETTS.

MARKING MACHINE.

Application filed October 27, 1926. Serial No. 144,523.

My present invention relates to marking machines and particularly to an improved marking machine for marking hides or skins.

In the manufacture of leather from hides or skins, an important operation is the measuring of the superficial area of such hide or skin and heretofore this superficial measuring operation has necessitated an extra operation in that an operator is required to mark manually on the hide the area as determined by the machine. Various attempts have been made to associate with the superficial measuring machine a marking device, none of which, as far as I am aware, have been successful.

In my present invention, I have devised a marking machine which is associated with a superficial area measuring machine and the setting of the marking device is controlled and operated in synchronism with mechanism forming part of the measuring machine.

In carrying out my invention I associate with the measuring machine a marking device in which the marking instrumentalities are set by the measuring machine and in which the marking instrumentalities are operated to print or stamp the area of the hide on the hide by the movement of such hide through the measuring machine.

The principal object of my invention, therefore, is an improved marking device.

Another object of my invention is an improved marking device adapted to be positioned in synchronism with an area measuring machine.

A further object of my invention is an improved marking device associated with an area measuring machine and operated in synchronism with the passage of material through the measuring machine.

Other objects and novel features of the construction and arrangement of parts of the invention will appear as the description of the invention progresses.

In the accompanying drawings,

Fig. 3 is a sectional elevation on the line 3—3 of Fig. 2;

Figure 1:
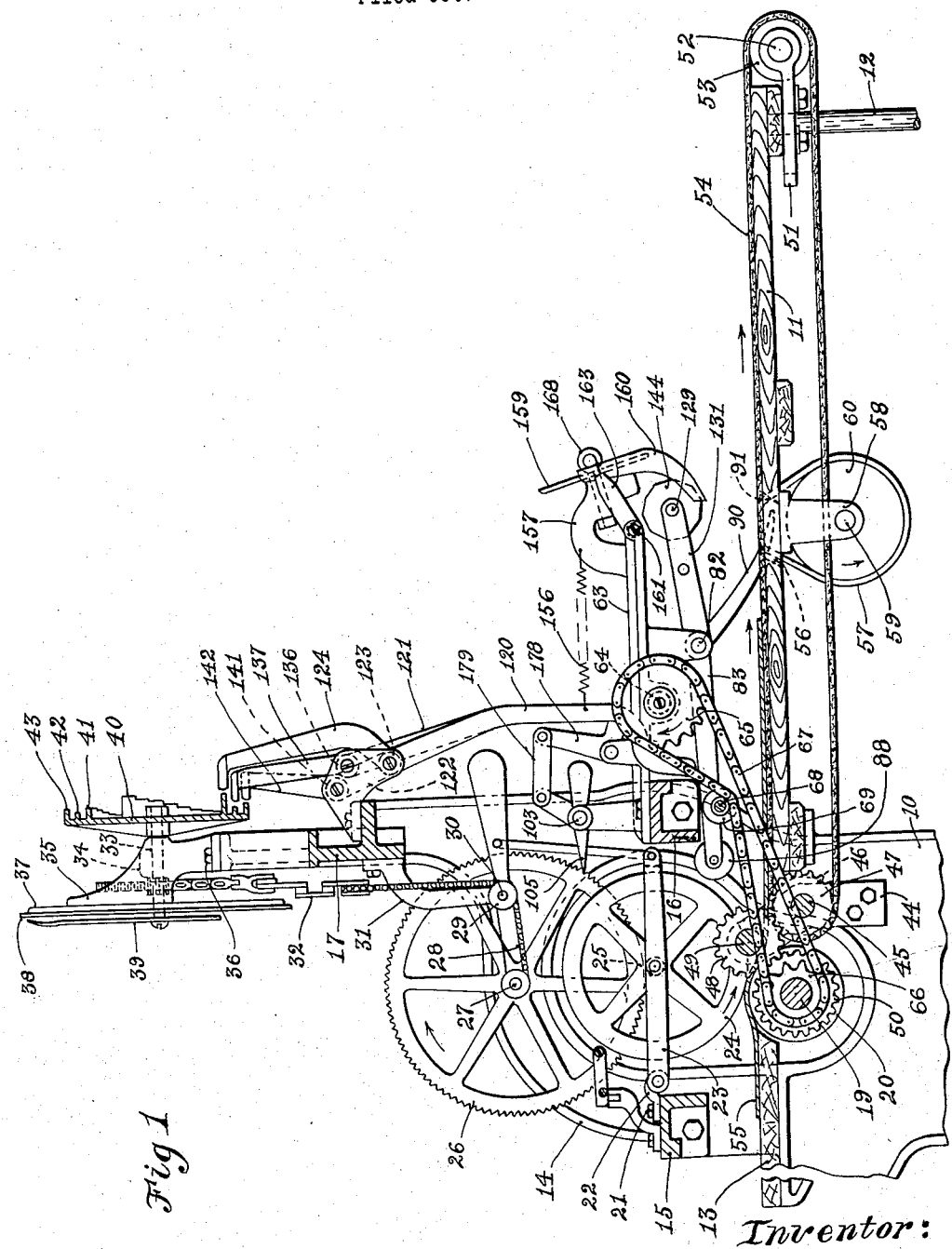
Fig. 1 is a side elevation, partly in section, of a measuring machine to which my invention has been applied.
Figure 2:
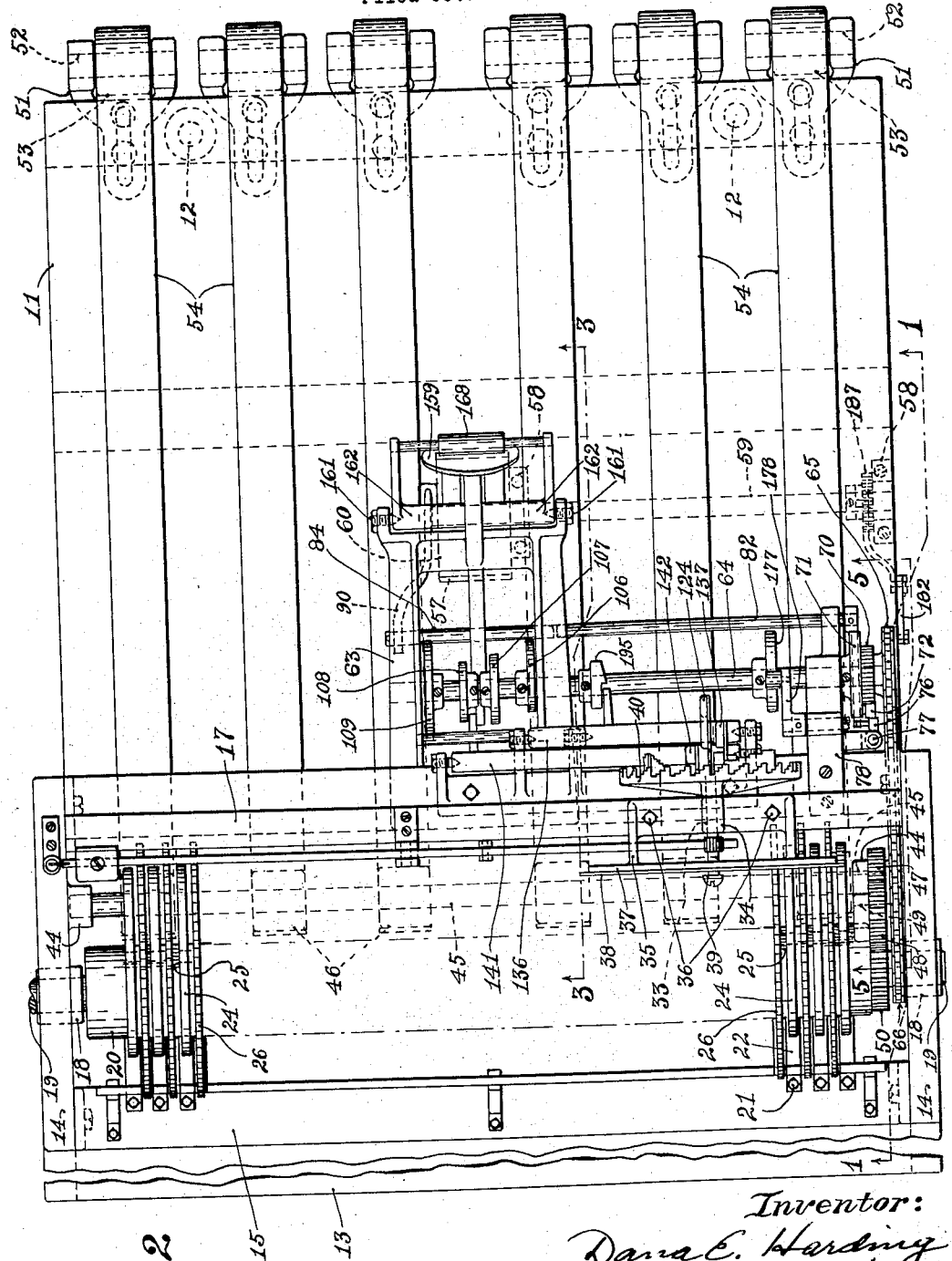
Fig. 2 is a plan view of Fig. 1.
Figure 4:
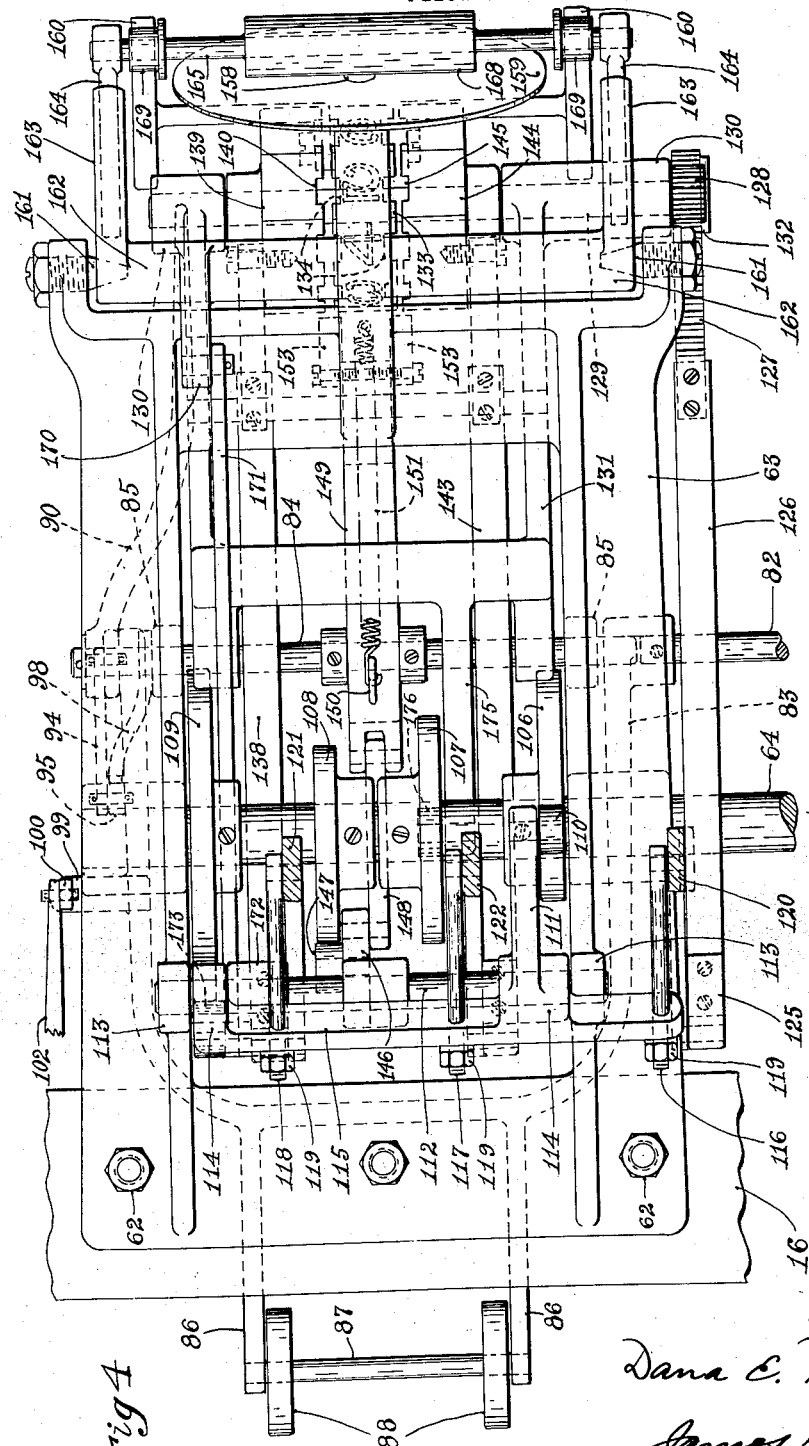
Fig. 4 is an enlarged plan view of a portion of Fig. 2 showing the printing device.

In the drawings, only so much of the measuring machine has been shown as is necessary to a full understanding of my invention, and, referring to the drawings, 10 designates a base or pedestal, on the top of which is mounted in any desired manner, a table or platform 11, the outer end of this platform being supported by uprights 12. Also mounted on the pedestal 10, at one end of the table or platform 11, is a second platform or table 13, the upper surface of this table being slightly above the upper surface of the table 11, and further, these tables are separated from each other any suitable or desirable distance. Mounted on top of the pedestal 10, on each side of the tables 11 and 13, and extending upwardly therefrom, are standards 14, these standards being tied together adjacent their lower end by cross beams 15 and 16 respectively and intermediate the upper and lower ends by a cross beam 17. Rotatably mounted in bearings 18, in the sides of the base 10, is a shaft 19, this shaft being provided with means (not shown) for connecting the same to any suitable source of power and by means of which the shaft 19 may be rotated. Secured to the shaft 19, between the bearings 18, is a roll 20 of any convenient diameter and of any desired material, this roll, as will be obvious from Fig. 1, extending upward in the space between the platforms 11 and 13 and with its upper surface slightly above the upper surface of the platform 13.

Secured to the upper surface of the cross beam 15 by bolts 21 are members 22 and to the free end of these members are pivotally mounted frames 23, these frames extending toward and terminating adjacent to the cross beam 16. In each of the frames 23 is rotatably mounted an idler measuring wheel 24, which wheels are adapted to engage with and to be rotated by the roll 20, the direction of the rotation of such wheels 24 being indicated by the arrow shown in Fig. 1. Associated with each of the wheels 24 is a pinion 25. Each of these pinions 25 is adapted to engage with a corresponding gear 26, each rotatably mounted on a shaft 27 that has its ends secured in arms pivoted at 30. Normally, the idler measuring wheels 24 are in engagement with the roll 20 and, therefore, the rectangular frames 23 carrying such wheels 24 will swing downwardly so as to bring the pinions 25 out of engagement with the gears 26. To the hub of each of the gears 26 is secured one end of a chain 28, or other flexible member, each which chain passes under an idler roll 29 mounted on a shaft 30 secured in bearing brackets 31 on the cross beam 17. Through a system of levers 32, that is well known in the measuring art, the movement of the individual measuring wheels 24 is transmitted to a shaft 33 rotatably mounted in a bearing 34 formed as an integral part of a bracket 35 that is secured by bolts 36 to the top surface of the cross beam 17. Also formed as an integral part of the bracket 35 is a face plate 37 in which is formed a forward bearing for the shaft 33 and secured to the front face of the plate 37 is a dail 38, provided with suitable graduations thereon. Secured to the end of the shaft 33 is an indicating hand 39 adapted to co-operate with the indications on the dial 38, to indicate visually the area of a hide or skin as determined by the measuring wheels 24. Secured to the shaft 33 at the end thereof remote from the indicating hand 39 is an annularly flanged wheel 40. This flanged wheel 40 has a plurality of annular rims or projections 41, 42 and 43 thereon designating respectively units, tens and fractions, it being customary to measure the area of the skins or hides in square feet and fractions thereof such as ¼, ½, and ¾ of a square foot.

Figure 5:
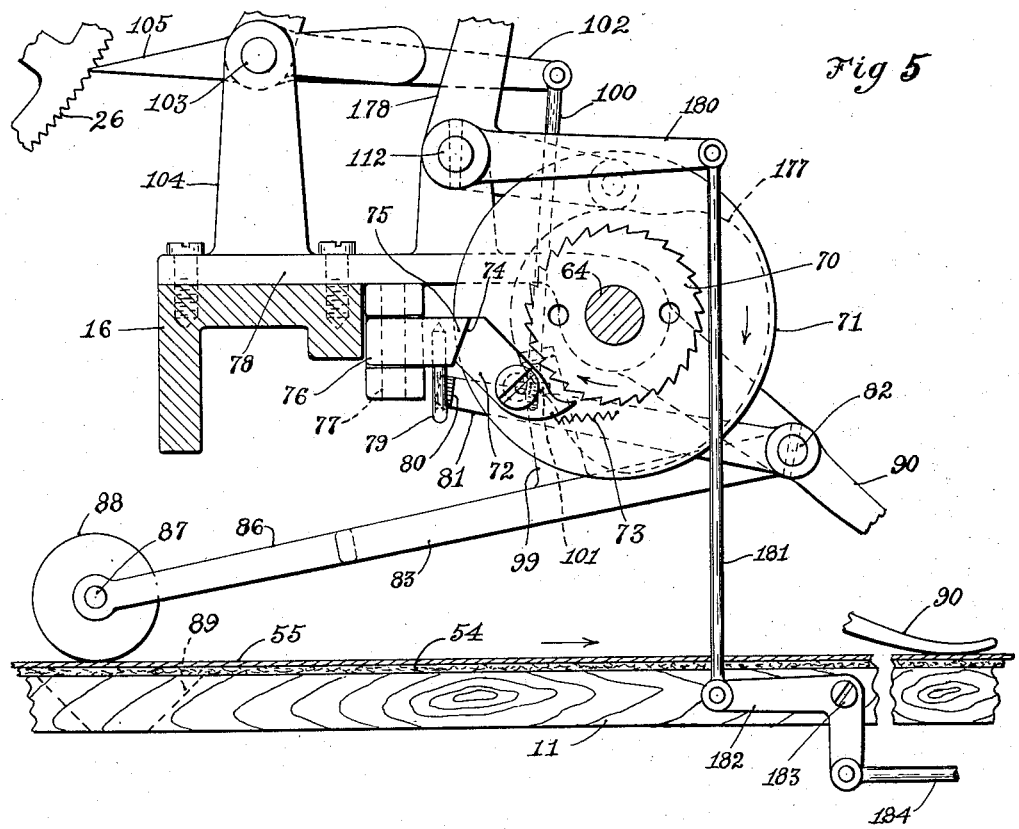
Fig. 5 is a sectional elevation on the line 5—5 of Fig. 2.
Figures 6, 7, 8, 9:
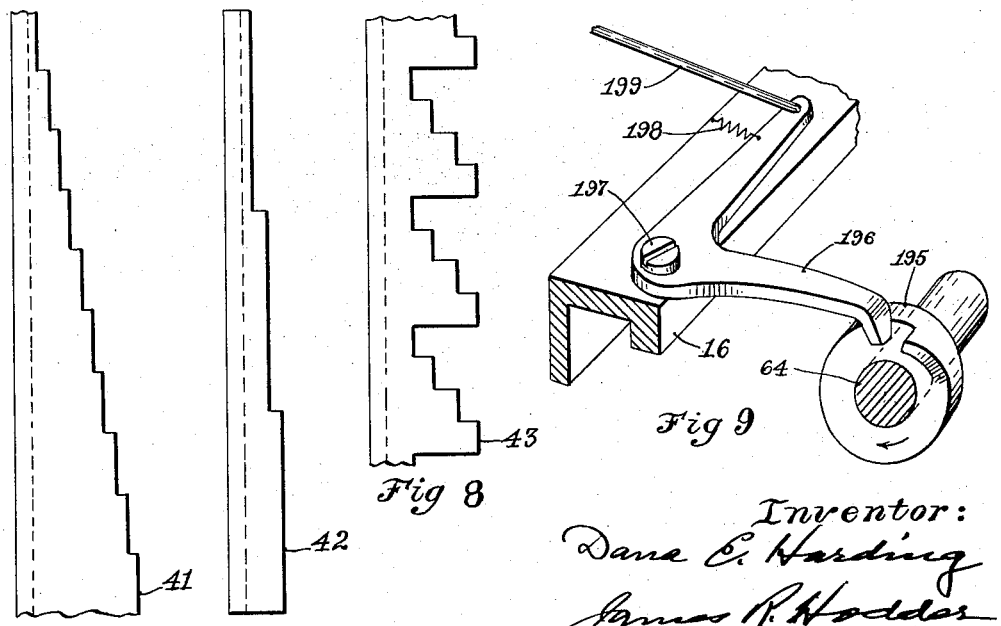
Fig. 6 is a development of a portion of the unit wheel associated with the measuring machine.
Fig. 7 is a development of the tens wheel associated with the measuring machine.
Fig. 8 is a development of a portion of the fractions wheel associated with the measuring machine.
Fig. 9 is a perspective view of a portion of the machine showing the trip for the one-way revolution clutch.

Referring to Figs. 6, 7 and 8, there is shown a development of a portion of each of the rims 41, 42 and 43, from which figures the method of making same will be apparent. Secured to the sides of the base 10 are bearings 44 in which is rotatably mounted a shaft 45, this shaft lying below the surface of the table or platform 11 and between such platform 11 and the platform 13. Secured to such shaft 45 at intervals along its length are pulleys 46 and secured to one end of such shaft 45 is a gear 47 that meshes with an idler gear 48, which idler gear is rotatably mounted on a stub shaft 49 secured to bearings 44. This idler gear 48 meshes with and is driven by a gear 50 secured to the main shaft 19. Secured to the under side of the platform 11 at the end thereof remote from the shaft 45 is a plurality of parallelly arranged adjustably mounted brackets 51, each of these brackets having secured thereto a shaft 52. On each of the shafts 52 is rotatably mounted a pulley 53, there being as many pulleys 53 as there are pulleys 46 on the shaft 45 and the pulleys 53 are in alignment with the pulleys 46. Over the pulleys 46 and 53 run endless conveyor belts 54, these endless conveyor belts being, therefore, parallelly arranged with respect to each other and the upper reach of each of the belts runs over the top of the platform 11 and preferably normally in engagement therewith, this upper reach moving in the direction of the arrow shown in Fig. 1. A hide or skin 55 being fed over the platform 13 and over the roller 20, between the plurality of measuring wheels 24, will be moved onto the endless conveyor belts 54 and the speed of such belts is substantially equal to the surface speed of the roller 20 and, therefore, of the measuring wheels 24. The platform 11 at any convenient point thereof, but preferably adjacent its center and between two of the endless conveyor belts 54, is cut away at a plurality of parallelly arranged spaced points 56, the spaces 56 being practically parallelly arranged slots extending crosswise of the platform 11 and through which slots an endless belt 57 may pass upward and thence downward so that portions of such endless conveyor 57 rests on the platform 11 and lies between and parallel to two of the endless conveyor belts 54. Secured to the under face of the platform 11 are spaced bearings 58, in which is rotatably mounted a shaft 59 and secured to said shaft is a pulley 60 over which runs the endless belt 57. It is obvious that, if the shaft 59 is rotated, that the pulley 60 will also rotate and will bring successive portions of the endless belt 57 onto the platform 11. The means by which such shaft 59 is rotated will be hereinafter described, it being sufficient at this point to state that such shaft will be intermittently rotated in the direction of the arrow shown in Figs. 1 and 3. Secured to the cross bar 16, by bolts 62 and extending forwardly therefrom, or in the direction in which the upper reach of the endless conveyors 54 are travelling, is a framework 63. Rotatably mounted in such framework is a shaft 64 and the end of such shaft has rotatably mounted thereon a sprocket wheel 65 which is in alignment with a sprocket wheel 66, secured to the shaft 19 and over such sprocket wheels runs an endless sprocket chain 67 and by means of which the shaft 64 is driven in the direction of the arrow indicated in Figs. 1 and 3. Secured to one of the side members 14 is a stub shaft 68 on which is rotatably mounted an idler tensioning roll 69 which engages with the endless sprocket chain 67, as clearly shown in Fig. 1. Secured to the inner face of the sprocket wheel 65 is a ratchet wheel 70 and this ratchet wheel, therefore, runs continuously with the sprocket 65 in the direction of the arrow shown, for example, in Fig. 5. Adjacent to the ratchet 70 and secured to the shaft 64, is a plate or disc 71, and pivotally mounted on such disc is a pawl 72, having attached thereto a spring 73 that normally urges said pawl into engagement with the ratchet 70 to thereby connect the shaft 64 to the sprocket 65. One end of the pawl 72 is wedge-shaped, as indicated at 74, and this wedge-shaped portion is adapted to be engaged by a corresponding wedge-shaped portion 75 of a member 76 that is pivotally mounted on a pin 77 secured to the under face of a bearing bracket 78 that rests on the top of the cross beam 16. Secured to one side of the member 76 and extending downwardly therefrom is a pin 79 adapted to be engaged by a wedge-shaped face 80 on the end of an arm 81 that is secured to a clutch trip rod 82. The clutch trip rod is, in turn, secured to a U-shaped frame 83 provided with a rod or shaft 84 in axial alignment with the clutch trip rod 82 and this shaft 84 is rotatably mounted in suitable bearings 85 depending from the framework 63. The end of the U-shaped frame 83, remote from the shaft 84, is provided with rearwardly extending spaced arms 86 in which is rotatably mounted a shaft 87, having secured thereto spaced rolls 88. The U-shaped frame 83 has pivotal movement about the shaft 84 as a center and the rolls 88 are adapted, therefore, to swing downwardly toward the platform 11 and this platform is cut away, as indicated at 89, to provide recesses into which the rolls 88 may drop. Pivoting onto the shaft 84 and extending forwardly with respect to the frame 83 is a trip finger 90, such finger normally housing within a slot or groove 91 formed in the tops of the plaform 11. Secured to the clutch trip rod 82 adjacent to the attaching point of the trip finger 90 is a crank arm 93, this crank arm 93 having pivotally attached to its free end one end of a connecting rod 94. The connecting rod 94 is pivotally attached at its other end to the free end of a latch 95 that is secured at 96 to the U-shaped frame 83. Formed on the latch 95 is a latch portion 97, which, when the parts are in the position shown in Fig. 3, engages with a latch arm 98 that is secured to one face of the bearing 85. Formed on the U-shaped frame 83 and extending upwardly therefrom is an arm 99 through which passes the lower threaded end of a substantially vertical rod 100, the nut 101 of such threaded end providing for adjustment of the rod 100 with respect to the arm 99. The upper end of this rod 100 is pivotally attached to the outer end of an arm 102 secured to the shaft 103, that is rotatably mounted in bearings 104. Also secured to the shaft 103 are locking arms 105, one for each of the gears 26 and which serve to lock the gears 26 in their set position until automatically released.

On the shaft 64 are secured a plurality of cams 106, 107, 108 and 109 respectively. The cam 106 is adapted to engage with a roller 110 rotatably mounted at the end of an arm 111 of a rocker arm that is secured to the shaft 112 rotatably mounted in bearings 113 on the upper surface of the frame 63. The other arms 114 of this rocker arm are connected by a cross bar 115, said cross bar being provided with spaced perforations through which extend the substantially horizontal rods 116, 117 and 118 respectively. The rear or left-hand end of these rods 116, 117 and 118, as viewed in Fig. 3, are threaded to receive adjusting nuts 119. The rods 116, 117 and 118 are pivotally attached at the ends remote from the adjusting nuts to levers 120, 121 and 122 respectively. The lever 120 is secured at its upper end to a shaft 123 that is pivotally mounted on bearings secured to the cross beam 17. Also secured to the shaft 123 and extending upwardly therefrom is a lever 124 which is adapted to engage with the unit rim 41 on the member 40. The lower end of the lever 120 has pivotally attached thereto a member 125, to which is secured a flexible inextensible member 126. The end of the flexible inextensible member 126 has secured at the end remote from the member 125 a rack 127 which engages with a pinion 128 secured to the shaft 129 and rotatably mounted in bearings 130 on a frame 131, that is pivotally mounted on the clutch trip rod 82, and which frame extends forwardly of the frame 63 or to the right of the clutch trip rod 82, as viewed in Fig. 3. Secured to the frame 131 is a guideway 132 which engages with the rack 127 and holds such rack in engagement with the pinion 128. Secured to the shaft 129 intermediate its ends is a printing wheel 133, which has engraved thereon characters as 1, 2, 3 etc. to indicate units in the marking device. This printing wheel is provided about its periphery and on either side thereof with notches 134 for a purpose to be hereinafter described. The rod 118 has the end thereof remote from the adjusting nut 119 pivotally attached to the lever 121 and this lever 121 is secured at its upper end to a shaft 136 that is pivotally mounted in bearings on the cross beam 17. Also attached to the shaft 136 and extending upwardly therefrom is a lever 137. the upper end of which is adapted to engage with the tens annular ring or rim 42 on the member 40. Pivotally attached to the lower end of the lever 121 and extending forwardly therefrom is a member 138. The forward end of the member 138 is pivotally attached to a character wheel 139 having engraved thereon characters representing the tens of the numbers used in the marking device. This member 139 is rotatably mounted on the shaft 129 and on the face of such member adjacent to the member 133 are grooves 140, these grooves being in alinement with the opposite grooves 134 of such member 133. The lever 122 is attached at its upper end to a shaft 141 pivotally mounted on suitable bearings on the cross beam 17 and secured to such shaft 141 and extending upwardly therefrom is a lever 142 the upper end of which co-operates with the fractions ring or rim 43 on the member 40. The lower end of the lever 122 has pivotally attached thereto the rear end of a member 143 and this member 143 is pivotally attached at its forward end to a character wheel 144 that is rotatably mounted on the shaft 129 and adjacent to the character wheel 133. This character wheel 144 has engraved thereon characters representing fractions of the numbers to be used in the marking machine and also such character wheel is provided with notches 145, which notches are in alinement with the notches 134 on the character wheel 133. Depending on which portion of the rims 41, 42 and 43, the levers 124, 137 and 142 engage, will depend the amount of movement of the members 126, 138 and 143 and therefore the amount of rotative movement of the character wheels 133, 139 and 144 and, therefore, on this will depend the setting of a series of characters representing the area in square feet or other desired unit of the measurement of the hide which has been measured by the plurality of measuring wheels 24 and which area is designated on the dial 38 by the hand 39.

Rotatably mounted on the shaft 112 and depending downwardly therefrom is a lever 146 and rotatably mounted on such lever, intermediate its ends, is a cam roller 147, which is engaged by the cam 108 secured to the shaft 64. To the lower end of the lever 146 is pivotally attached one end of a connecting link 148 and the forward end of this link is pivotally attached to a member 149 slidably mounted in the frame 131. On the upper face of the member 149 is formed a lug 150, to which is attached one end of a coil spring 151 and the other end of this coil spring is attached to a downwardly depending pin 152 secured to the under face of the forward end of the frame 63. The extreme forward end of the member 149 is provided on either side thereof with wedge-shaped members 153, these wedge shaped members having a slight parallel motion and being adapted to engage with the alined notches 134, 145 and 134, 140 on the character wheels 144, 133 and 139, these wedge-shaped members 153 serving to lock the character wheels in their set position as determined by the annular rims 41, 42 and 43. Each of the levers 120, 121 and 122 have attached thereto one end of springs 156, the other end of these springs being attached to a member 157 secured to or formed on the forward end of the frame 63 and these springs 156 urge the lower end of the levers forward or to the right, as viewed in Fig. 3. Rotatably mounted on the member 157 and substantially horizontal is a shaft 158 having secured thereto at its front end a circular plate 159 and which plate is adapted to hold the ink for inking the characters on the character rolls above referred to. Secured to the member 157 on either side of the plate 159 and extending downwardly in a curved path to a point adjacent the lower face of the character wheels are guide rails 160. Pivotally mounted on bearings 161 on the frame 63 is a shaft 162, this shaft having formed at each end thereof forwardly and upwardly extending open-sided guides 163. Slidably mounted in the guides 163 are shafts 164, the outer ends of these guides forming bearings in which is rotatably mounted a shaft 165. These open sides of the members 163 and surrounding the shafts 146 are coil springs 166, a cotter pin 167 on each shaft retaining the springs 166 in operative relation to the shafts 164, these springs urging the shafts 164 inward or to the left, as viewed in Fig. 3. On the shaft 165 is an inking roll 168 and also on the shaft 165, adjacent either end thereof, are rolls 169, which rolls engage with the curved tracks 160 and act to guide the inking roll 168 into engagement with the set combination of characters on the character wheels 133, 144 and 139. It will be noted that the springs 166 hold the inking roll 168 yieldingly against the ink plate 159 and against the characters on the character wheels. Formed on or secured to the shaft 162 and extending radially outward therefrom is an arm 170 and to the free end of this arm is attached one end of a connecting rod 171. The other end of this connecting rod 171 is pivotally attached to the lower end of a lever 172 that is pivotally mounted on the shaft 112. Intermediate the ends of the lever 172 is rotatably mounted a cam roller 173 adapted to be engaged by the cam 109 on the shaft 64. Secured to the rod 171, intermediate its ends, is one end of a spring 174, the other end of this spring being attached to downwardly depending pin 152 on the frame 63. This spring 174 urges the connecting rod 171 forward or to the right, as shown in Fig. 3, and tends to rotate the shaft 162 in a clockwise direction, this tendency being controlled by the engagement of the cam roller 173 by the cam 109. As the shaft 64 rotates, however, in a clockwise direction, an oscillatory movement is imparted to the shaft 162 to give to the ink roll 168 an oscillatory movement over the circular plate 159 and the guide rails 160.

Formed on the frame 131 and extending rearwardly thereof is an arm 175 which has, at its outer end, a rotatably mounted cam roller 176 that is engaged by the cam 107, the engagement of the cam roller 176 and the cam 107 controlling the operation of the frame 131. At the proper instant, therefore, the cam roller 176 is allowed to rise, as viewed in Fig. 3, and the outer or right-hand end of such frame carrying the character wheels above referred to drops and engages with the hide or skin 55 as it moves along over the platform 11. The endless belt 57 of felt or other suitable material lies in the path of movement of the character wheels so that such endless belt 57 forms a resilient platen for the characters on the character wheels. The cam 107 is a quick-acting cam and the downward and upward movement of the end of the frame 131 is practically instantaneous and said frame 131 is returned rapidly to its normal or initial position, as viewed in Fig. 3. On the shaft 64 is a cam 177 which engages with a roll on one arm of a bell crank lever 178, which bell crank lever is connected by a link 179 to the pawl locking devices 105 on the shaft 103 and such cam operates to release the gears 26 and allow the indicating mechanism to return to normal position. Also, rotation of the shaft 103 will cause a rotary movement of the crank arm 102 in an anticlockwise direction, as viewed in Fig. 3, and will lift the rod 100 whereupon the adjusting nut 101 will engage with the member 99. This causes an upward movement of the free end of the frame 83, which upward movement will continue until the latch 95 engages with the latch arm 98, as shown in Fig. 3. The members 126, 138 and 143 are flexible inextensible members being made flexible so as to be capable of bending movement about the clutch trip rod 82 when the forward or free end of the frame 131 is allowed to move downwardly carrying the character wheels into engagement with the face of the hide or skin 55. Secured to the shaft 112 is an arm 180 which has pivotally attached to its outer free end the upper end of a connecting rod 181. This rod 181 at its lower end is pivotally attached to one arm of a bell crank lever 182 that is pivotally attached by screw 183 to the platform 11 and the other arm of such bell crank lever is connected to one end of a connecting rod 184, this connecting rod extending forwardly and being pivotally attached at its other end to a crank arm 185, that is rotatably mounted on the shaft 59. Pivotally mounted on the arm 185 is a pawl 186 which engages with a ratchet 187 secured to the shaft 59, on which is mounted the pulley 60. An intermittent rotary movement of the shaft 59 is, therefore, rendered possible and by this means a new portion of the endless member 57 is brought into the path of movement of the character wheels above referred to. Also secured to the shaft 64 is a cam 195 adapted to engage with one end of an arm of a bell crank lever 196 pivotally mounted on a screw 197 on the cross beam 16, a spring 198 constantly urging the bell crank lever 196 into engagement with the cam 195. Pivotally attached to one end of the bell crank lever 196 is one end of an arm 199 which extends rearwardly of the mechanism shown and described to release a succeeding hide or skin from a feeding means to be fed into the area measuring machine.

The operation of my improved device is as follows, it being assumed that the device has been attached to the area measuring machine in the manner above set forth and that a hide or skin as 55 is passed through the measuring machine for the purpose of determining the area of such skin or hide 55: The hide or skin passes over the roll 20 and under the plurality of measuring wheels 24, thereby bringing the pinions 25 into engagement with their respective gear wheels 26 and the area of the hide is gradually measured, such measurement being visually indicated on the dial 38 by means of the indicating hand 39. Simultaneous with such movement of the indicating hand 39, there is a corresponding and equal rotary movement of the member 40 to rotate the stepped rims 42 and 43 in direct proportion to the movement of the indicating hand 39. As the hide or skin 55 passes through the measuring machine, it is fed onto the endless conveyors 54 and moved in the direction of the arrows shown in Figs. 1 and 3, for example, until the front end of such hide or skin engages with the lower free end of the finger 90, the extreme end of which is housed in the slot 91 in the platform 11. Such finger 90 is, therefore, moved forwardly about the clutch trip rod 82 as a center and will release the latch 95 on the U-shaped frame 83 from the arm 98. Such U-shaped frame 83 will, therefore, drop about the clutch trip rod 82 as a center until the wheels 88 on the extension 86 of such frame 83 come into engagement with the upper surface of the hide or skin 55. When the hide or skin 55 has passed entirely through the measuring machine or beyond the influence of the measuring wheels 24, the rear end of such hide or skin will pass under the rolls 88 and will allow such rolls 88 to drop into the grooves or slots 89 in the platform 11, whereupon the member 99 on such arm 83 will engage with the adjusting nut 101 on the rod 100 and will rotate the shaft 103 to bring the locking members 105 into engagement with the gears 26 to lock the indication of the total area of the hide or skin as visually indicated by the pointer 39 on the dial 38. Also, and obviously, it will lock the member 40 in predetermined position with respect to such pointer 39. The dropping of the wheels 88 into the slots 89 will cause a sufficient rotary movement of the clutch trip rod 82 in an anti-clockwise direction to bring the bevel face 80 on the arm 81 into engagement with the rod 79 on the member 76, thereby moving such memebr 76 out of engagement with the bevel face 74 of the spring-pressed pawl 72 and will allow the spring 73 to move such pawl into engagement with the ratchet 70, which, as above described, is continuously rotating. The shaft 64 now starts in rotation and the cam 106 engaging with the roll 110 on the arm 111 will rotate the shaft 112 to cause the member 115 to release the rods 116 and bring the levers 120, 121 and 122 into position to allow the respective attached levers 124, 137 and 142 into engagement with the corresponding set portions of the rims 41, 42 and 43 and causing a setting of the character wheels 133, 139 and 144 in accordance with the area of a hide or skin just measured. Immediately the character wheels are set, the cam 108 operates to move the locking wedges 153 into engagement with the alined notches 145, 134 and 140 to lock the character wheels above noted in set position. Immediately thereafter the cam 109 operates the connecting rod 171 to move the inking roll 168 over the inking plate 159 and onto the set characters on the character wheels to ink the same. The cam 107 now operates to allow the frame 131 carrying the character wheels to drop into position to bring the set characters on such character wheels into engagement with the face of the hide or skin 55 to impress thereon the total area, as determined by the measuring machine. Immediately the frame 131 is returned to its initial position by the cam 107, the cam 177 operates the bell crank lever 178 to move the locking devices 105 from their associated gears 26 to thereby allow the area measuring mechanism to return to normal position to also rotate the shaft 112 to cause an intermittent movement of the pulley 60 to move a fresh surface of the member 57 into the path of movement of the character wheels and also by the operation of the rod 100 moves the U-shaped frame 83 back into its normal position, as shown in Fig. 3. Also the cam 195 operates the bell crank lever 196 to control the release rod 199 for the next succeeding hide or skin. As the shaft 64 completes its revolution, the bevel face 74 on the pawl 72 engages with the bevel face 75 on the pivoted member 76 and such engagement rotates the pawl 72 out of engagement with the ratchet 70 and the mechanism is brought to rest in its normal or initial position.

The above sequence of operations are repeated indefinitely with each succeeding hide or skin measured.

Having thus described my invention, what I claim as new is:

1. In a machine of the class described, the combination of a measuring machine, including a plurality of parallelly arranged integrating gears, indicating mechanism forming part of said measuring machine and indicating the results of the measuring operation, a locking device associated with said integrating gears for locking the same in set position to maintain the indicating mechanism in operated condition, a marking device, means associated with the indicating mechanism and controlling the setting of the marking device, a control lever operated by the passage of material through the measuring machine for initiating the operation of setting the marking device and means connecting said control lever and locking devices for permitting the operation of the marking device only after the setting device has reached its maximum displacement.

2. In a machine of the class described, the combination of a measuring machine, a marking device, a control lever associated with the marking device and operable on the passage of material through the measuring machine for permitting association of the measuring machine and marking device.

3. In a machine of the class described, the combination of a measuring machine, a marking device, a lever associated with the marking device and operated by the passage of material through the measuring machine, a pivotally mounted lever controlled in its operation by the control lever and a clutch operated by said pivotally mounted lever after the passage of material through the measuring machine for permitting association of the measuring machine and marking device.

4. In a machine of the class described, the combination of a measuring machine, a marking device associated therewith, a plurality of independently operable character bearing mechanisms on the marking device and means for controlling the operation of the mechanisms with the measuring machine whereby a setting of the independently operable character bearing devices is permitted only after a predetermined time in the passage of material to be measured through the machine.

5. In a machine of the class described, the combination of a measuring machine, a marking device, character bearing elements on said marking device, means for setting said character bearing elements independently of each other and means for moving said character bearing devices into association with the material as it passes through the measuring machine.

6. In a machine of the class described, the combination of a measuring machine, a marking device, a plurality of independently movable character wheels thereon, means for independently controlling the character bearing wheels in accordance with the movement of the measuring machine and means controlled by the passage of material through the machine for moving said character bearing wheels into association with the material as it passes through the machine.

7. In a machine of the class described, the combination of a measuring machine, a marking device, an endless conveyor associated with the marking machine and measuring device and controlling means for connecting said marking devices with said measuring machine associated with the endless conveyor.

In testimony whereof, I have signed my name to this specification.

DANA E. HARDING.